United States Patent [19]

Min

[11] Patent Number: 5,245,883

[45] Date of Patent: Sep. 21, 1993

[54] INTEGRAL TYPE REDUCTION MECHANISM FOR TAPE RECORDER

[75] Inventor: Young H. Min, Kyounggi, Rep. of Korea

[73] Assignee: SamSung Electronics Co., Ltd., Suwon, Rep. of Korea

[21] Appl. No.: 749,452

[22] Filed: Aug. 26, 1991

[30] Foreign Application Priority Data

Aug. 30, 1990 [KR] Rep. of Korea .................. 90-13286

[51] Int. Cl.[5] .............................................. F16H 57/02
[52] U.S. Cl. ..................................... 74/414; 74/606 R
[58] Field of Search .............................. 74/414, 606 R

[56] References Cited

U.S. PATENT DOCUMENTS

| 1,872,861 | 8/1932 | Wise | 74/606 R X |
|---|---|---|---|
| 2,762,232 | 9/1956 | Bade | 74/606 R X |
| 2,883,880 | 4/1959 | Merkle | 74/606 R |
| 2,943,507 | 7/1960 | Bachman | 74/606 R X |
| 2,952,165 | 9/1960 | Bade | 74/606 R |
| 3,198,028 | 8/1965 | Dahl et al. | 74/606 R X |
| 3,792,578 | 2/1974 | Hetzel | 74/606 R X |
| 3,931,748 | 1/1976 | Tertinek et al. | 74/606 R |

FOREIGN PATENT DOCUMENTS 2256753  5/1974  Fed. Rep. of Germany .... 74/606 R

Primary Examiner—Allan D. Herrmann
Assistant Examiner—William O. Trousdell
Attorney, Agent, or Firm—Robert E. Bushnell

[57] ABSTRACT

A reduction mechanism for a tape recorder is disclosed, and the mechanism includes a lower gear box, an upper gear box and a main chassis. The lower gear box contains a plurality of reduction gears, and the upper gear box covers the lower gear box, with the upper gear box being secured to the lower gear box in an integral form by being microwave-welded. The lower and upper gear boxes constitute a reduction mechanism, and the reduction mechanism is secured to the main chassis by means of screw members. According to the present invention, the displacements of the components are prevented so as for the reducing function to become wholesome, and the productivity is improved.

5 Claims, 2 Drawing Sheets

INTEGRAL TYPE REDUCTION MECHANISM FOR TAPE RECORDER

FIELD OF THE INVENTION

The present invention relates to an integral type reduction mechanism for a tape recorder, and particularly to an integral type reduction mechanism for a digital audio tape recorder or a digital video tape recorder, in which the reduction mechanism for performing the speed reducing function during the loading or unloading of tapes is formed integrally with the gear box, so that the reduction mechanism can be attached and detached to and from the main chassis in a convenient manner.

BACKGROUND OF THE INVENTION

Generally, there are two kinds of reduction mechanisms for performing the speed reducing function during the loading or unloading of tapes in a tape recorder: the reduction mechanism using a worm gear of a large reduction ratio, and the reduction mechanism using a plurality of reduction gears.

However, the reduction mechanism using a worm gear has the disadvantage of occupying a large installation area, and difficulties are encountered in assembling it. Therefore, the reduction mechanism using a plurality of reduction gears is generally used, and this will be described below.

As shown in FIG. 1, a reduction mechanism 100 which performs the reducing function by means of a plurality of reduction gears is constituted such that: a reduction mechanism section 10 for reducing the revolution speed of a motor (not shown in the drawings) is installed on a main chassis 101; and a reduction mechanism section cover 20 covering the reduction mechanism section 10 is coupled with the main chassis 101 by means of screw members 21.

The reduction mechanism section 10 includes: a first revolution shaft 11 with a driving gear 17 and a pulley 18 attached thereon; a second revolution shaft 12 with a driven gear 19 installed thereon; and first and second fixed shafts 13,14 with a plurality of reduction gears 22-24, 25-27 freely rotatably installed thereon.

The conventional reduction mechanism 100 is installed in such a manner that first and second revolution shafts installing bushes 15,16 and first and second reduction gears installing fixed shafts 13,14 are press-fitted to proper positions on the main chassis 101.

Thereafter, the first and second revolution shafts 11,12 are fitted into the respective bushes 15,16, and a plurality of the reduction gears 22-24, 25-27 are fitted to the first and second fixed shafts 13,14 in such a manner that they should be meshed with each other so as for the revolutions of the motor to be reduced.

The main chassis 101 is turned upside down, and the pulley 18 for receiving the power from the motor is coupled with the end of the first revolution shaft 11.

After the completion of the installation of the reduction mechanism section 10 as described above, the main chassis 101 is turned upside down again. Then, the reduction mechanism section cover 20 is attached over the reduction mechanism section 10 and on the main chassis 101 by means of screw members 21, thereby completing the assembling of the reduction mechanism 100.

In the above described reduction mechanism for tape recorders, the first and second fixed shafts and the first and second bushes for installing the first and second revolution shafts are directly secured on the main chassis, and the first and second revolution shafts and the respective gears are installed, with the reduction mechanism section cover being installed thereafter. Due to such a complicated procedure, the distances between the shafts are varied caused by the machining inaccuracies and deformations of the main chassis, with the result that accurate operations become impossible. Further, due to the complicated assembling procedure, the productivity is lowered, and the manufacturing cost is increased.

Further, the reduction mechanism section is covered with a separate cover, so that the coupled portions can be displaced due to the vibrations of the motor, with the result that deviations in the meshes of the reduction gears occur. This brings the result that motor revolution losses occur, and that the loading and unloading of the tape are adversely affected, thereby deteriorating the reliability of the products.

SUMMARY OF THE INVENTION

Therefore it is the object of the present invention to provide an integral type reduction mechanism for a tape recorder, in which the reduction mechanism section for performing the reducing function during the loading or unloading of tapes is formed integrally with the reduction mechanism section cover in the form of molded products, thereby rendering the attaching and detaching of the reduction mechanism to and from the main chassis more convenient, and rendering the reduction of the revolutions of the motor more accurate.

According to the present invention, there is provided an integral type reduction mechanism for a tape recorder performing a reduction function in loading and unloading tapes by means of the reduction mechanism secured on a main chassis, the reduction mechanism comprising:

a reduction mechanism 200 consisting of a lower gear box 29 for installing a plurality of reduction gears, and an upper gear box 28 assembled with an integral form on the lower gear box 29; and a main chassis 101 having coupling holes 102 and an open slot 103 for detachably attaching the reduction mechanism 200.

BRIEF DESCRIPTION OF THE DRAWINGS

The above object and other advantages of the present invention will become more apparent by describing in detail the preferred embodiments of the present invention with reference to the attached drawings in which.

DESCRIPTION OF THE PREFERRED EMBODIMENT

Figure 1:
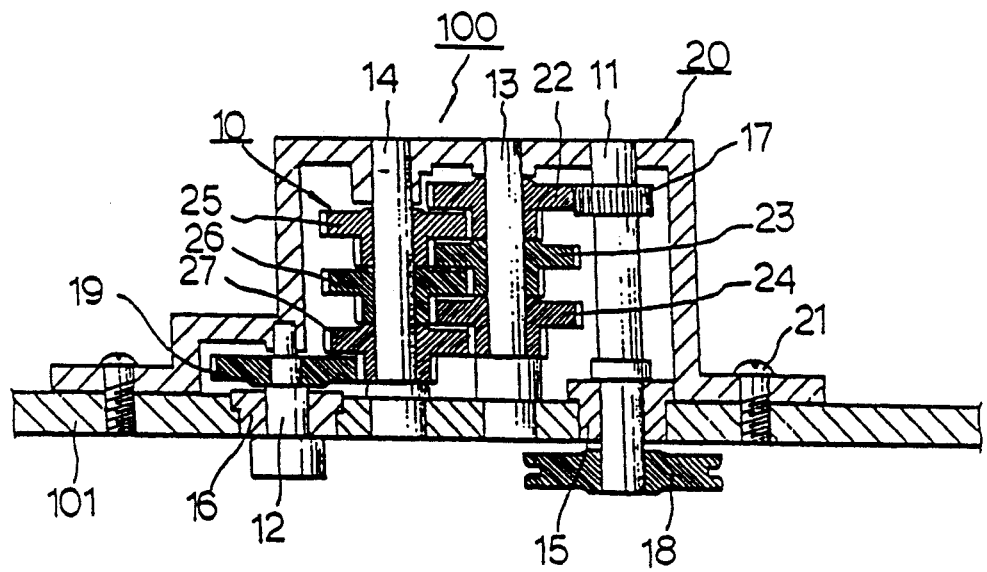
FIG. 1 is a sectional-view of the reduction gear mechanism of a conventional tape recorder.
Figure 2:
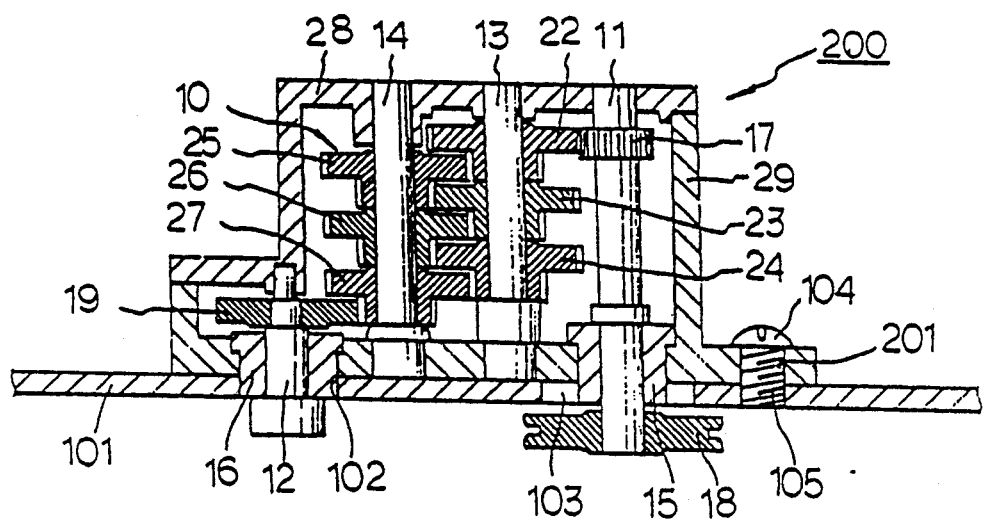
FIG. 2 is a sectional-view of the integral type reduction mechanism of the tape recorder according to the present invention.
Figure 3A:
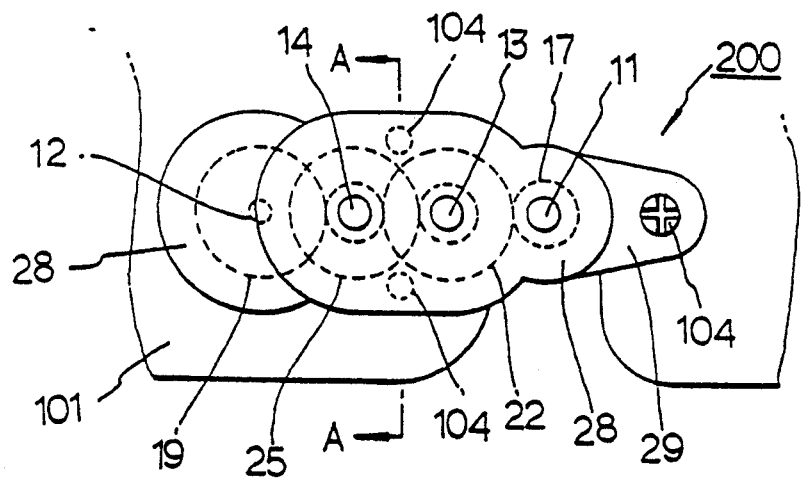
FIG. 3A is a plane view showing the assembled state of the integral type reduction mechanism according to the present invention.
Figure 3B:
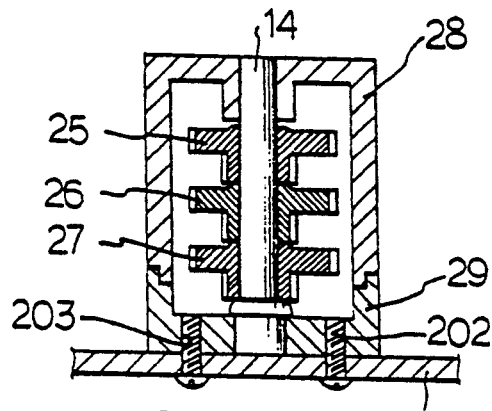
FIG. 3B is a sectional-view taken along the line A—A of FIG. 3A.
Figure 4:
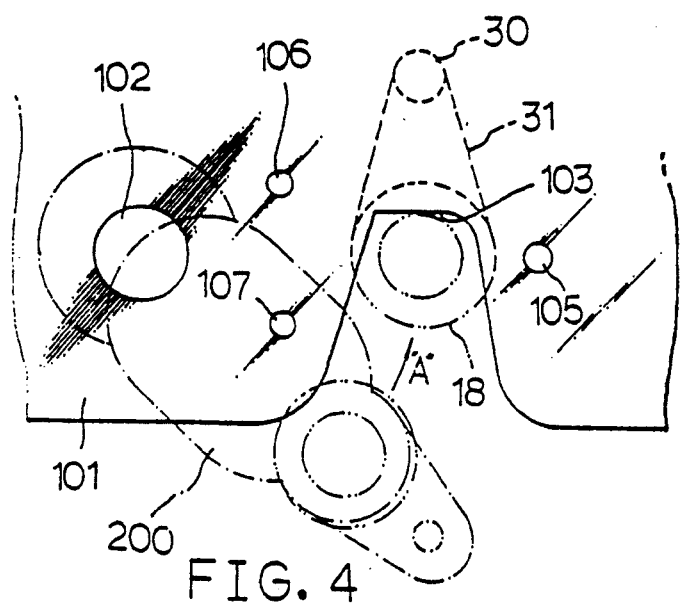
FIG. 4 is a schematical plane view of the critical portion of the main chassis according to the present invention.

FIGS. 2 to 4 illustrate integral type reduction mechanisms according to the present invention. As shown in these drawings, a reduction mechanism section 10 for performing the function of reducing the revolutions of a motor 30 is installed within upper and lower gear boxes 28,29, thereby constituting a reduction mechanism 200 of the present invention. The reduction mechanism 200 is coupled with a main chassis 101 by means of screw members 104.

The reduction mechanism section 10 includes: a first revolution shaft 11 with a driving gear 17 and a pulley 18 installed thereon; a second revolution shaft 12 with a driven gear 19 installed thereon; and first and second fixed shafts 13,14 with a plurality of reduction gears 22-24,25-27 freely rotatably installed thereon.

The upper and lower gear boxes 28,29 are molded products, and are united by a microwave welding, with the reduction mechanism section 10 installed therein.

Now the procedure of installing the reduction mechanism section 10 into the upper and lower gear boxes 28,29 will be described.

Bushes 15,16 are press-fitted to the bottom of the lower gear box 29 in a projected form, and the first and second revolution shafts 11,12 are rotatably fitted into the bushes 15,16. Thereafter, the pulley 18 is installed to the end of the first revolution shaft 11 in such a manner that the pulley can receive a driving power through a belt 31 from the motor 30 which is installed at a proper position on the main chassis 101. Further, the first and second fixed shafts 13,14 are press-fitted on the lower gear box 29 and between the first and second revolution shafts 11,12, and the reduction gears 22-24,25-27 are meshed with each other in an alternate form.

Then, the driving gear 17 is installed to the first revolution shaft 11 in such a manner that it should be meshed with the leading reduction gear 22 of the fixed shaft 13. Further, the driven gear 19 is installed to the second revolution shaft 12 in such a manner that it is to be meshed with the reduction gear 27 of the second fixed shaft 14. Thus the installation of the reduction mechanism section 10 into the lower gear box 29 is completed, and then, the upper gear box 28 is integrally coupled with the lower gear box 29 by the microwave welding, thereby completing the assembling of the integral type reduction mechanism 200.

Then, the reduction mechanism 200 is secured to the main chassis 101 in the manner described below. That is, the bush 16 which is projected from the bottom of the lower gear box 29 of the reduction mechanism 200 is fitted into a coupling hole 102 of the main chassis 101, and then, the reduction mechanism 200 is turned around the coupling hole 102 in the direction of the arrow mark A of FIG. 4, so that the bush 15 with the pulley 18 installed thereon should be supported by an open slot 103.

Thus, after coupling the reduction mechanism 200 with the main chassis 101, it is fastened by driving screw members 104 through screw holes 105-107,201-203, and then, a belt 31 is installed between the pulley of the motor 30 and the pulley 18 of the first revolution shaft 11, thereby completing the installation of the reduction mechanism 200 (on the main chassis 101).

In the present invention described above, the reduction mechanism 200 is so separately constituted that the reduction mechanism section 10 is installed into the upper and lower gear boxes 28,29 so as for an integral unit to be formed, and therefore, the verticalities of the first and second revolution shafts 11,12, and the first and second fixed shafts 13,14 can be perfectly maintained, with the result that smooth reductions can be carried out.

Further, as the integral type reduction mechanism 200 is secured on the main chassis 101 by means of screw members 104, the displacements of the components by the vibrations of the motor 30 are prevented, with the result that perfect meshes are maintained between the driving gear 17, a plurality of the reduction gears 22-27, and the driven gear 19 installed to the first and second revolution shafts 11,12 and the first and second fixed shafts 13,14, and that the revolving power of the motor 30 can be transmitted in an accurate manner.

According to the present invention as described above, the reduction mechanism, which is constituted in an integral form and performs the reducing function during the loading and unloading of tapes, is secured on the main chassis, and therefore, the displacement of the components due to the vibrations can be prevented so as for the reducing function to be carried out in a perfect manner, as well as improving the productivity because of the simplification of the assembling process.

The invention is in no way limited to the embodiment described hereinabove. Various modifications of the disclosed embodiment as well as other embodiments of the invention will become apparent to persons skilled in the art upon reference to the description of the invention. It is, therefore, contemplated that the appended claims will cover any such modifications or embodiments as fall within the true scope of the invention.

What is claimed is:

1. An integral type reduction mechanism for a recorder performing a reduction function in loading and unloading record media for the recorder by means of said reduction mechanism secured on a main chassis, said reduction mechanism comprising:
    reduction means comprising:
        a plurality of fixed shafts;
        a plurality of reduction gears installed on each of said plurality of fixed shafts;
        a lower gear box for mounting said plurality of fixed shafts; and
        an upper gear box integrally assembled on said lower gear box; and
    a main chassis having a coupling hole and an open slot, said open slot bordering on an edge of said main chassis and said reduction means being attached to said main chassis.

2. The reduction mechanism for a recorder as claimed in claim 1, further comprised of said upper gear box comprised of a molded product and said lower gear box comprised of a molded product, said upper gear box and said lower gear box being coupled together in an integral form by microwave welding.

3. The reduction mechanism for a tape recorder as claimed in claim 1, further comprised of:
    said lower gear box having a bottom;
    a first bushing fitted into both said bottom of said lower gear box and said coupling hole;
    a first shaft rotatably fitted into said first bushing;
    a second bushing fitted into said bottom of said lower gear box and rotated about said coupling hole into said open slot; and a second shaft rotatably fitted into said second bushing, a pulley attached to said second shaft.

4. An integral type reduction mechanism for a recorder performing a reduction function in loading and unloading record media for the recorder by means of said reduction mechanism secured on a main chassis, said reduction mechanism comprising:
reduction means comprising:
a plurality of fixed shafts;
a plurality of reduction gears installed on each of said plurality of fixed shafts;
a lower gear box for mounting of fixed shafts; and
an upper gear box integrally assembled on said lower gear box, said upper gear box, being integrally coupled with the lower gear box by welding; and
a main chassis having a coupling hole and an open slot, said open slot bordering on an edge of said main chassis and said reduction means being attached to said main chassis.

5. The integral type reduction mechanism of claim 4, further comprised of:
said lower gear box having a bottom;
a first bushing fitted into both said bottom of said lower gear box and said coupling hole;
a first shaft rotatably fitted into said first bushing;
a second bushing fitted into said bottom of said lower gear box and rotated about said coupling hole into said open slot;
a second shaft rotatably fitted into said second bushing, a pulley attached to said second shaft.

* * * * *